March 7, 1961  L. H. NORDLUND  2,974,304
CLOSE-FOLLOWING VEHICLE WARNING SYSTEM
Filed Jan. 15, 1960  2 Sheets-Sheet 2
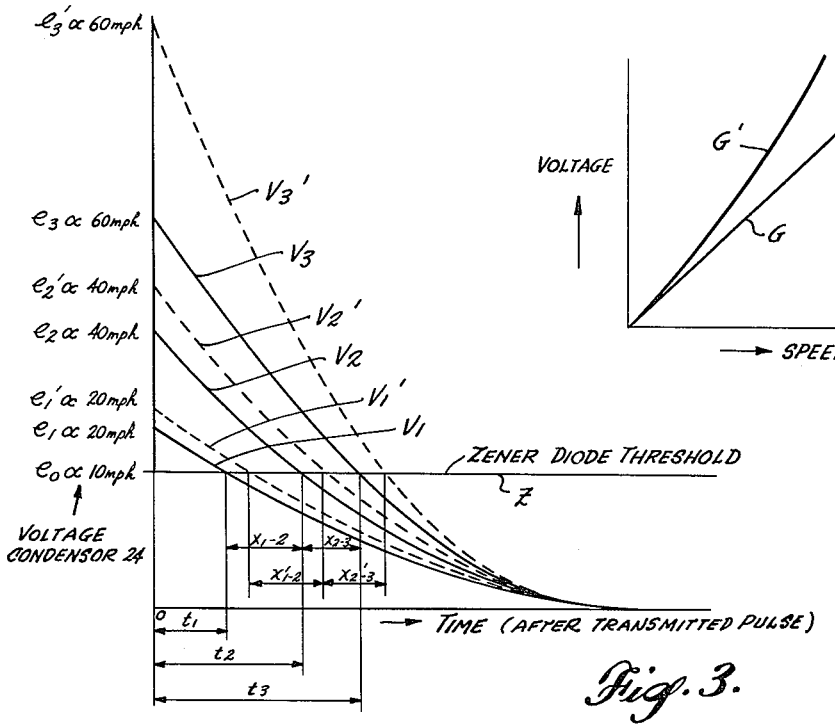
Fig. 3.
Fig. 4.
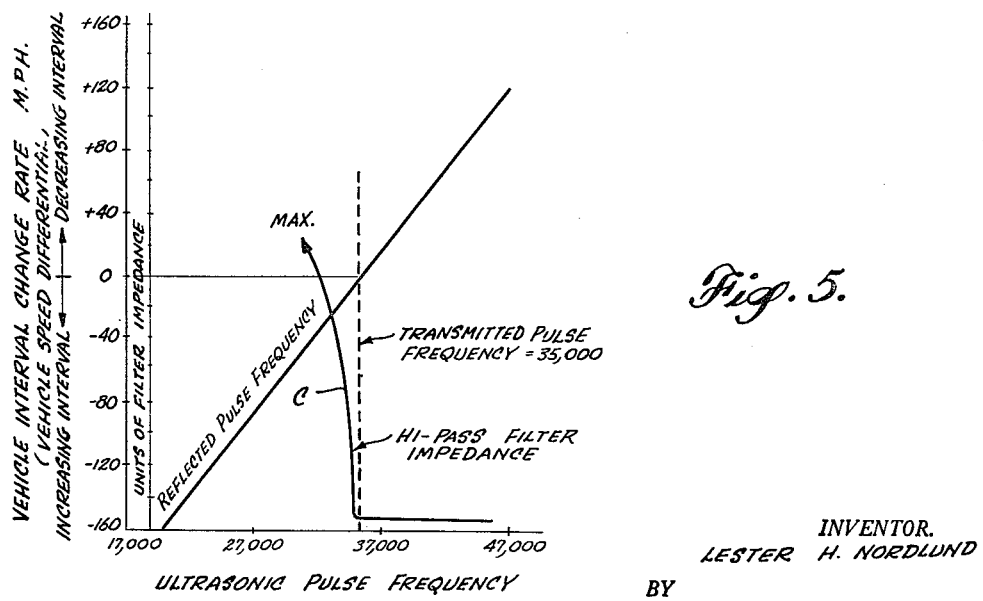
Fig. 5.
INVENTOR.
LESTER H. NORDLUND
BY
Reynolds Beach & Christensen
ATTORNEYS

United States Patent Office 2,974,304
Patented Mar. 7, 1961

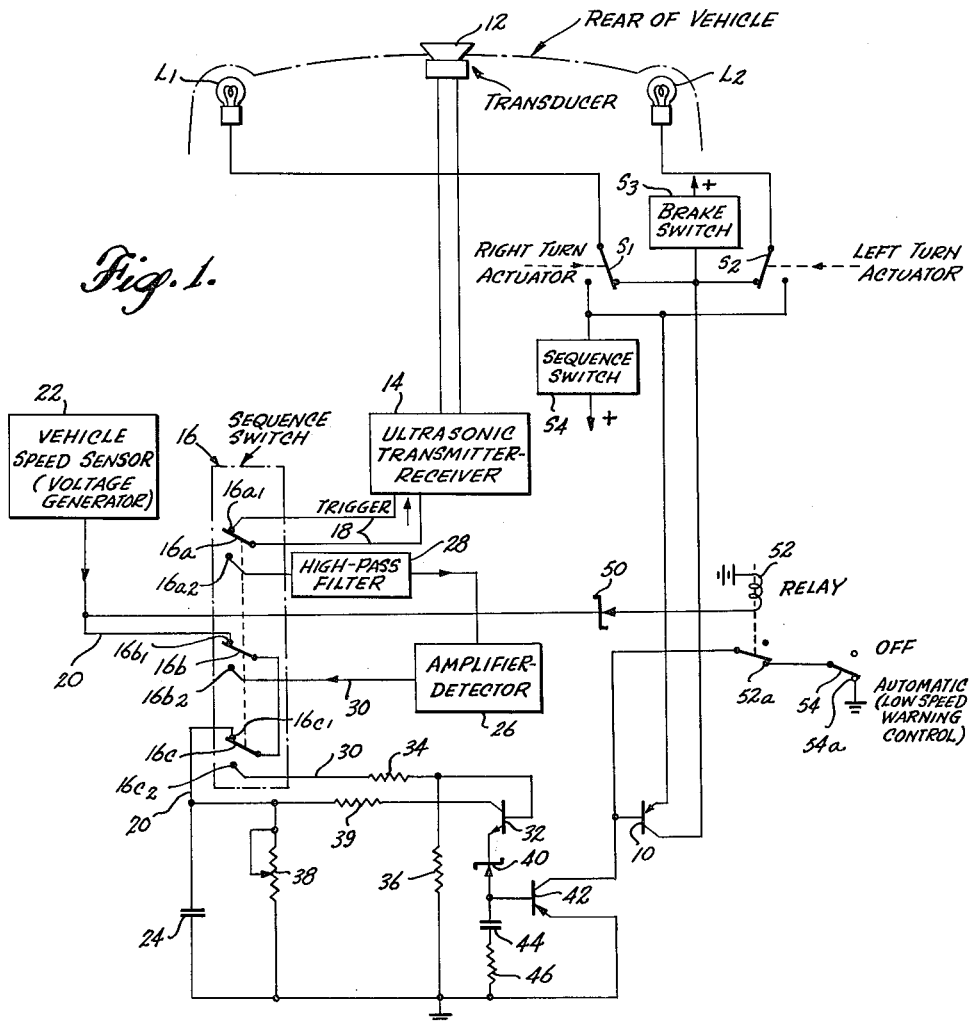

2,974,304

CLOSE-FOLLOWING VEHICLE WARNING SYSTEM

Lester H. Nordlund, Rte. 2, Box 642F, Tacoma 22, Wash.

Filed Jan. 15, 1960, Ser. No. 2,695

9 Claims. (Cl. 340—104)

This invention relates to an automatic warning system to be carried in automobiles and other vehicles for the purpose of warning a vehicle which is following immediately behind it when the distance separating them becomes less than the minimum required safe following distance. The invention is herein illustratively described by reference to the presently preferred embodiment thereof; however, it will be recognized that certain modifications and changes therein with respect to details may be made without departing from the underlying essentials involved.

Highway traffic statistics reveal that one of the major causes of automobile accidents is that of following too closely behind the vehicle ahead. Traffic laws prohibiting close following have been in effect for years but do not hold the answer because persons are not always conscious of their violations or are unable to judge the minimum distance necessary for safety at different speeds.

A broad object of the present invention is to provide a practicable and effective warning system which is completely self-contained within its carrier vehicle and therefore does not depend for its operation upon the acquisition or functioning of special equipment in the following vehicle. Thus, any automobile owner desiring protection against other drivers following too closely behind his vehicle may incorporate the novel system as an integral part of the signalling apparatus in his own vehicle so as to provide the desired warning signals to other vehicles which approach too closely behind independently of whether the other vehicle operator is sufficiently concerned about the problem to provide any equipment of his own.

Still another object is a reliable automatic close-following warning system which provides unmistakable signals to the following vehicle when the safe distance is not being observed.

A further object is such a warning system which operates reliably not only under highway conditions in which the traffic is strung out but under congested traffic conditions as well by discriminating against detection signals which would occur from the presence of vehicles and objects other than a following vehicle.

Still another object is a warning system of the type described which, though utilizing electronically attainable sensitivity necessary for pulse-echo detection systems, is relatively simple and inexpensive.

A related object is to provide such a system which utilizes existing automobile-type display indicator lights to provide the warning signals to the following motorist as an effective means to draw his attention and alert him to the danger, and as a technique by which apparatus costs are minimized.

A specific object, in terms of operational characteristics of the preferred embodiment of the invention, is to provide a warning signal only in the case of a vehicle that is following too closely at the speed of the carrier vehicle or at a somewhat greater speed, whereas no warning is provided, nor is it necessary, in the event the following vehicle is dropping back at a rate which exceeds a predetermined value or is already at a safe following distance.

In accordance with this invention as herein disclosed, periodic impulses of ultrasonic energy are radiated rearwardly at restricted-width beam, and the resulting reflection impulses or echoes which occur from an object such as a following vehicle in the energy path are detected by the system. By comparing the time lapse between energy transmission and reception with an established time interval representing vehicle speed, the circuit determines whether the spacing or distance to the following vehicle is less than the safe following distance at the particular speed and actuates warning indicator means on the basis thereof. In accordance with an important feature, the system includes in its receiving channel a high-pass filter or equivalent frequency-sensitive means capable of discriminating against or rejecting those echo signals which occur at a frequency materially below the transmitted frequency by reason of the Doppler shift. Thus, extraneous and unwanted echo signals occurring from reflections off vehicles moving in the opposite direction, or from stationary objects, or from similar warning systems installed in carrier vehicles moving in the opposite direction are discriminated against by the system so as to avoid false and confusing operation of the warning indicator lights or other warning means used. The combined or total discrimination capability of the circuit resulting from this form of utilization of the Doppler principle, from employing a transducer of restricted beam width and from such other available circuit techniques as threshold biasing of the receiving amplifiers so that signals weaker than a predetermined level are rejected, provides a workable and practicable system which will operate successfully under highway driving conditions as well as under congested city street driving conditions.

As a further important feature, circuit simplifications are achieved by the expedient of by-passing the usual procedure in sonar and radar practices of measuring time interval as a means to measure distance prior to utilization of the resultant measurement; instead, the system directly applies the received echo impulses to the utilization apparatus (i.e., warning indicator actuation circuit) to operate the same in the event the safe following distance of the succeeding vehicle is not being observed. To this end, the utilization apparatus in this case is rendered sensitive to the echo signals only during a predetermined initial portion of the total period between successive transmitted impulses, which portion is automatically varied as a function of vehicle speed so as to allow for speed-proportional variations in safe following distance.

As a further feature, the system includes means by which warning signals are prevented at vehicle speeds below a predetermined speed, such as ten miles per hour, in case, through preference, this is considered desirable.

As still another important feature, the system is adapted to operate through the existing stop and turning signal light control circuits, utilizing the stop lights as a warning indicator. However, by appropriate circuit connections, operation of the stop lights by the brake switch is preferably given priority over operation of those lights by the close-following warning control system.

These and other features, objects and advantages of the invention will become more fully evident from the following description thereof by reference to the accompanying drawings illustrating the presently preferred embodiment and operating characteristics thereof.

Figure 1 is a partially schematic, partially block diagram of the system.

Figure 2 is a simpified plan view diagrammatically illustrating operation of the system under typical traffic conditions.

Figure 3 is a graph illustrating certain functional relationships in the electrical circuit of the system.

Figure 4 is a graph illustrating the characteristic of a speed sensing generator which may be used as one means to provide nonlinearity compensation in the circuit.

Figure 5 is a graph illustrating the Doppler effect and the characteristic of a circuit element (i.e., a high-pass filter) by which signal discrimination is achieved on the basis thereof.

Referring to the drawings, the outline of the rear of a vehicle is shown by broken lines and incorporates the usual stop and turning indicator lights L1 and L2. Right and left turn signal switches S1 and S2 when in their normal positions form energizing circuits for the respective lights L1 and L2, which circuits are energized by actuation of the brake switch S3 when the vehicle brake is being applied. In customary manner both lights illuminate simultaneously when the brake switch closes. Whether or not the brake switch is closed, should either of the switches S1 or S2 be actuated to its alternate position in order to signal a right or left turn, the associated stop light L1 or L2 is connected in circuit with the sequence switch S4 which causes intermittent energization and deenergization of that stop light in order to signal the turn. The circuitry and the switching arrangements in this respect are or may be conventional. Power supply means (the vehicle battery) and associated connections to the described switches are omitted for simplicity in the drawing.

In the preferred embodiment of the present invention this existing stop and turn indicator system involving the stop lights L1 and L2 and the switching circuits therefor are utilized to advantage for the additional function of providing the desired close-following warning signals which alert the operator of the following vehicle to the fact that he is too close for safe driving. In order to accomplish this result, the system is designed so as to cause intermittent simultaneous energization and deenergization of both stop lights L1 and L2 at substantially the frequency at which the intermittent turning indicator signals occur. In effect, the system comprising the present invention provides an electronically controlled switch by which sequence switch S4 is connected directly to both indicator lights L1 and L2 through the switches S1 and S2 in their normal, illustrated positions. This additional switching connection remains in effect and the stop lights continue to blink on and off as long as the following vehicle continues to remain at an unsafely close distance behind the carrier vehicle. In the illustrated embodiment power transistor 10 (which could as well be a vacuum tube, a relay or other electrically controlled switch) serves as the controlled switch element performing the described function. However, because it is functionally a switch by which the sequence switch S4 is permitted to apply voltage intermittently to the lights L1 and L2, its operating condition does not in any way affect the normal stop light operation. Thus, whenever the brake switch S3 is actuated, the stop lights both remain continuously energized regardless of whether or not the sequence switch S4 is connected to the indicator lights. Furthermore, it will be seen that the connections are such that the turning signal indicators do not operate separately as long as the succeeding vehicle remains too close behind for safety. In other words, the normal stop light operation takes priority over the close-following indicator warning operation and the latter takes priority over the turning indicator operation. This is a matter of choice, however, and is subject to variations if necessary or desirable, such as to meet the requirements of local municipal laws. Nevertheless, it is considered imperative that the stop light function take priority over the warning signal function in any case.

As stated above, power transistor 10 functions effectively as one form of switch suitable for controlled actuation by the system in order to operate the close-following warning indicators which in this case comprise the existing stop and turning lights in the vehicle. The principal features of the invention reside in the system by which such a switch is controlled in accordance with the stated objectives. These will now be described.

In a suitable location at the rear of the vehicle is mounted an ultrasonic sound-electrical transducer 12 of any suitable directional type which has a restricted beam width for transmission and reception and which is designed for efficient operation at a practicable ultrasonic frequency such as 35 kilocycles per second. The operating frequency is subject to some variation, however. Ultrasonics are much preferred to radar techniques in any case because the time intervals in a pulse-echo sound system are of course much longer than those in an electromagnetic wave energy system and are therefore more easily and inexpensively managed in terms of circuit techniques and requirements. The ultrasonic transducer 12 is connected to be energized by a suitable high-frequency oscillator and to provide energization to a suitable high-frequency receiver preferably having a relatively broadband response characteristic in order to accept reflected signals at the frequency of transmission as well as signals which are at a somewhat higher frequency as a result of the Doppler shift. It is not necessary to accept Doppler-shift frequencies lower than the transmitted frequency but, as a practical matter, the attainment of a response characteristic which cuts off sharply at the transmitted frequency while accepting higher frequencies in order to eliminate the lower frequencies is difficult. Consequently, it is desirable to employ the high-pass filter to be described subsequently herein. The ultrasonic transmitter and receiver are shown as combined in the example, and together are designated 14. These circuits may be of any suitable or conventional type having the requisite power capacity and sensitivity for the task.

The transmitter is periodically rendered operative during the brief times switch 16a is closed, the terminals of such switch being connected through leads 18 to the transmitter circuit (not shown). Switch 16a is part of a sequence switch 16 which remains in continuous operation to alternately reverse the position of its switching elements 16a, 16b and 16c as illustrated. The frequency of operation of the sequence switch 16 is subject to some variation or choice, but is found that a frequency of two cycles per second is suitable in most cases. Any of various automatic recycling switches are suitable for this purpose. The transmit time is preferably made very short in comparison with the remaining or receive time in the total switching cycle of switch 16.

With switch 16a in its illustrated position, engaging contact 16a1 to energize the ultrasonic transmitter, serially connected switches 16b and 16c likewise engage their contacts 16b1 and 16c1, respectively, in order to complete a circuit connection through conductor 20 from a voltage generator 22 to a storage capacitor 24. The voltage generator 22 is of a type and is so operated as to provide an output voltage which is a function of vehicle speed; hence, is labeled vehicle speed sensor in the diagram. It may be driven from the drive shaft of the vehicle, from its speedometer cable, or otherwise. Its resulting output voltage is applied to the storage condenser 24 in order to charge the latter to such voltage during the brief period while the ultrasonic transmitter is operating. Upon reversal of the position of switch arms 16a, 16b and 16c, the ultrasonic transmitter is rendered inoperative and the vehicle speed sensor is disconnected from the condenser 24. At that instant, and during the ensuing reception interval, which represents by far the longer portion of the total operating cycle, switch arm 16a engages its alternate contact 16a2 in order to connect the ultrasonic receiver output to the amplifier-detector 26 through the medium of the interposed high-pass filter 28 to be described. Likewise switch arms 16b and 16c engage their respective contacts 16b2 and 16c2 in order to form a circut connection, through conductor 30, to the base of a transistor 32. The voltage applied from the amplifier-detector 26 to the transistor 32 is or may be reduced appropriately in value by a voltage divider comprising series resistance 34 and shunt resistance 36.

The sensitivity of amplifier-detector 26 is preferably chosen such that it does not appreciably amplify (i.e., it rejects) signals less than a predetermined amplitude. By this means a certain degree of discrimination is achieved as against unwanted signals from objects which are not directly in the main lobe region of the transmitted beam from transducer 12 or which for any reason are materially weaker than the echo signals which normally occur by reflection from a following vehicle which is within the intended operating range of the system. The restricted beam width of the transducer 12 provides an additional degree of discrimination against unwanted signals entering the system. The high-pass filter network 28, which may be of any suitable or known type, provides the greatest degree of discrimination by utilizing the Doppler effect as a means to prevent reflections from stationary objects or from vehicles moving in the opposite direction, as well as transmitted signals from similar warning systems in vehicles moving in the opposite direction. As shown in Figure 5 the operating characteristic C of the high-pass filter 28 is such that it presents a very high series impedance to signals from the receiver which occur at a frequency materially lower than the transmitted pulse frequency and a relatively low impedance to signals occurring at the same frequency or a higher frequency than the transmitted pulse frequency. The graph in this figure illustrates the frequency shift caused by the Doppler effect which occurs when the distance between the carrier vehicle and the following vehicle is changing. It will be noted from the graph that if the following vehicle is dropping back at a rapid rate the received frequency will be sufficiently lower than the transmitted frequency that the accompanying high impedance of the high-pass filter will tend to terminate an existing warning signal. Thus, the amplified and detected impulses which do pass through the amplifier-detector 26 to the base of transistor 32 are the result of a discriminatory process which largely insures that only the impulses from following vehicles which are too close and are not dropping back can affect the power transistor 10.

Because the transmitted pulse duration is a very short fraction of the total operating cycle of the system, condenser 24 commences to discharge through adjustable resistance 38 for all practical purposes at the same instant of time the transmitter is pulsed, it being permissible for purposes of the interval measurement performed by the circuit, and because the system is dealing with the propagation speed of sound and not radio waves, to ignore the period of time representing transmitter operation (i.e., transmitted pulse duration). Decay of voltage on condenser 24 occurs at an exponential rate. The instantaneous voltage which exists on the condenser is applied through a series resistance 39 to the collector terminal of transistor 32. The transistor emitter is connected through a Zener diode 40 to the base of a third, amplifying transistor 42. The collector of the latter is connected to the base of power transistor 10. The emitter of the transistor 42 is connected to the ground or return side of condenser 24. Across the base-emitter circuit of transistor 42 is connected a condenser 44 in series with a resistance 46.

The sensitivity of transistor 32 in relation to the output of amplifier-detector 26 is such that the transistor is driven to saturated condition by all output signals from the amplifier-detector which are passed by Zener diode 40. The Zener diode 40 establishes a threshold level which must be exceeded in terms of applied voltage from the condenser 24 before any received signal from amplifier-detector 26 will flow through the emitter-collector circuit of transistor 32 and the Zener diode, in order to reach the transistor 42. Thus, if the voltage on condenser 24 has decayed to a value below this threshold level no signal will reach transistor 42 and operate the control switch transistor 10. Such is the case when the succeeding vehicle is at or beyond the minimum safe following distance. On the other hand, if the vehicle which follows the carrier vehicle is too close, there will still be sufficient residual voltage on condenser 24 when the echo signal is received so that the latter will trigger an impulse of current flow through the transistor 32 and thereby produce actuation of transistors 42 and 10.

Another desirable function of Zener diode 40 is to block signals to the transistor 42 when the vehicle is moving at a speed less than a certain value, such as ten miles per hour as an example. Thus, when the vehicle is operating at this slow speed or less, even if the following vehicle is within a few feet of the carrier vehicle, so that the condenser 24 is still nearly fully charged when the echo signal is received, no pulse is applied to the transistor 42.

When the transistor 42 is energized by an impulse from transistor 32, it energizes transistor 10 in order to operate the warning lights L1 and L2. At the same time, an incremental charge is applied to condenser 44 through charging resistance 46 which serves a holding function, maintaining energization of transistor 42 for a limited period of time, but a period which is nevertheless sufficient to prevent deenergization of the switching circuit comprising transistor 10 in the limited period between successive transmitted pulses.

In Figure 3 the family of curves V1, V2 and V3 are exponential functions representing the decay characteristic of the voltage on condenser 24 commencing at a point of time representing the beginning of the reception interval following each transmitted ultrasonic impulse. The straight line Z parallel to the time axis in the graph represents the threshold of conduction of the Zener diode 40. The intersections between the curves V1, V2 and V3 with the threshold line Z occur at points of time t1, t2 and t3. The instantaneous speed of the vehicle determines the starting voltage of each decay curve, hence determines the particular exponential decay characteristic followed at different vehicle speeds. When the decaying voltage drops to a value below that represented by the threshold line Z, then any further signals coming from the amplifier-detector 26 are ineffective to produce an energizing impulse at the base of transistor 42, because of the barrier presented by the Zener diode.

Now, if the charging voltage source 22 has a linear characteristic as a function of speed, the starting voltages for the curves V1, V2 and V3 will be equally spaced along the voltage axis, as represented by the values e1, e2 and e3 corresponding, for example, to 20 miles per hour, 40 miles per hour, and 60 miles per hour, respectively. Because it is desirable to allow a certain definite distance between two vehicles, as the minimum safe following distance, which distance is normaly considered to be a direct function of speed, the decay curves V1, V2 and V3 should intersect the threshold line Z at equal spacings. Under the assumed circumstances they do so with only approximately equal spacings, as indicated by the time dimensions x1–2 and x2–3. By some standards this degree of approximation may be considered adequate for automatic control purposes, particularly if an overallowance for vehicle spacing is made for the lower speed conditions in order to provide adequate spacing at the higher speed conditions.

However, if it be desired to compensate for the progressive decrease in spacing as a function of increasing speed due to the exponential character of the decay curves V1, V2 and V3 (i.e., progressively steeper slopes), there are various convenient ways in which this may be done. In Figure 4 there is shown a curve G, representing the output of a linear-type voltage generator 22 which produces a voltage linearly related to speed. However, by choosing a vehicle speed sensor which generates voltage at a progressively increasing rate as a function of speed, as depicted by curve G', the starting voltage at the different speeds of the vehicle will be as represented by the initial points e1', e2' and e3' in Figure 3, resulting in the decay curves V1', V2' and V3'. These curves, representing vehicle speeds differing by a constant amount, are or may be so spaced as to intersect the threshold line Z at equally spaced points along that line (i.e., distance $x'1-2 = x'2-3$, etc.). This is one simple means of producing the desired compensation so that with each additional equal increment of speed increase of the carrier vehicle the indicated safe following distance will be increased by a given amount regardless of the speed at which the increase occurs. Other techniques for producing a similar compensation effect include means by which the Zener diode may be progressively biased as a function of speed in order to vary the threshold level of the circuit in which the Zener diode is connected, circuit means by which the decay characteristic of the condenser 24 is modified as a function of speed in order to achieve equal increments of time change in the cut-off characteristic of the pulsing circuit for transistor 42, etc.

Referring to Figure 2, a warning system installed in car A will sense the following car B. With a narrow transducer beam pattern, oppositely moving cars C and D in an adjacent lane will ordinarily not be sensed. However, if they do produce detectable echoes, the downward shift in frequency by Doppler effect will result in their rejection by the receiver high-pass filter. A similar system in car C, transmitting at the same frequency as that of car A will not operate the latter's warning system because of the Doppler shift. A stationary object such as a roadside tree E reflecting energy back to the car C system will likewise be rejected because of the Doppler shift and the reduced intensity of the echo resulting from the directionality of the transducer beam which is much more sensitive to objects on its axis of transmission than to those displaced therefrom by more than a few degrees of angle.

Referring back to Figure 1, it has already been stated that, as a matter of choice in this instance, the Zener diode 40 is designed to provide a threshold level which precludes any operation of the warning lights L1 and L2 when the speed of the vehicle drops below ten miles per hour, regardless of distance to the following vehicle. If, for any reason, with this particular circuit design it is desirable to provide warning to vehicles at lower speeds, the provision of a second Zener diode 50 connected in series with the coil of a relay 52, across the output of the generator 22 causes the disengagement of relay contact 52a and thereby interrupts a manual warning control circuit which includes the manually operated switch 54. When the vehicle speed is above ten miles per hour, Zener diode 50 conducts and the relay 52 is energized, maintaining an open circuit condition. However, when the vehicle speed drops below ten miles per hour the contact 52a is engaged and a circuit is formed to the base of transistor 10, so that when the manual control switch 54 is in its illustrated position engaging the ground contact 54a an automatic blinking stop light signal exists. By reversing the position of switch 54 the blinking stop light signal terminates. There is thus provided an additional useful feature in the system by which under normal driving conditions the application of the vehicle brakes produces illumination of the stop lights L1 and L2 in conventional manner, whereas when the vehicle slows down to a speed below a predetermined speed, such as ten miles per hour, the deenergization of relay 52 causes automatic blinking of the stop lights on a continuous basis, assuming switch 54 is in its illustrated position. Such a feature has utility independent of the interval warning system itself.

While the invention has been described in its presently preferred form, it will be recognized by those skilled in the art that the details thereof may be varied as may the circuit arrangements by which the results are accomplished, all within the scope of the invention.

I claim as my invention:

1. A close-following vehicle warning system comprising ultrasonic sound-electrical transducer means adapted for mounting in a rearwardly facing direction on a carrier vehicle for directionally selective transmission and reception of ultrasonic sound energy impulses, transmitter means connected to said transducer means operatively to apply thereto periodic energizing impulses of electrical energy at ultrasonic frequency, receiver means connected to said transducer means for electrically detecting ultrasonic sound impulses incident thereon by reflection from objects in the path of the transmitted sound energy during the period between transmitted impulses, said receiver means including frequency sensitive circuit means operable to discriminate against such electrically detected impulses shifted by Doppler effect to a frequency below said transmitter ultrasonic frequency, and warning indicator means adapted for mounting in the carrier vehicle to produce a warning indication to a vehicle following at an unsafely close distance behind the carrier vehicle, said latter means including a carrier vehicle speed measuring device synchronized with the periodic transmitter operation and operable thereby to establish after each transmitted pulse a time reference interval, which is at least approximately proportional to vehicle speed, representing minimum safe-following distance at the existing speed, and output circuit means responsively connected to the receiver means and to be controlled by said measuring device for producing a warning indication output in response to received signals occurring prior to termination of the established interval.

2. A close-following vehicle warning system comprising oscillatory propagative energy transmission and reception means adapted for mounting in a rearwardly facing direction on a carrier vehicle for directionally selective transmission and reception of propagative energy impulses, said reception means being operable for electrically detecting oscillatory energy impulses incident thereon by reflection from objects in the path of the transmitted energy during the period between transmitted impulses, said reception means including frequency sensitive circuit means operable to discriminate against received oscillatory energy shifted by Doppler effect to a frequency below that of said transmission means, and warning indicator means adapted for mounting in the carrier vehicle to produce a warning indication to a vehicle following at an unsafely close distance behind the carrier vehicle, said latter means including a carrier vehicle speed measuring device synchronized with the periodic transmitter operation and operable thereby to establish after each transmitted pulse a time reference interval, which is at least approximately proportional to vehicle speed, representing minimum safe-following distance at the existing speed, and output circuit means responsively connected to the reception means and to be controlled by said measuring device for producing a warning indication output in response to received signals occurring prior to termination of the established interval.

3. A close-following vehicle warning system comprising ultrasonic sound-electrical transducer means adapted for mounting in a rearwardly facing direction on a carrier vehicle for directionally selective transmission and reception of ultrasonic sound energy impulses, transmitter means connected to said transducer means operatively to apply thereto periodic energizing impulses of electrical energy at ultrasonic frequency, receiver means connected to said transducer means for electrically detecting ultrasonic sound impulses incident thereon by reflection from objects in the path of the transmitted sound energy during the periods between transmitted impulses, and warning indicator means adapted for mounting in the carrier vehicle to produce a warning indication to a vehicle following at an unsafely close distance behind the carrier vehicle, said latter means including a carrier vehicle speed measuring device synchronized with the periodic transmitter operation and operable thereby to establish after each transmitted pulse a time reference interval, which is at least approximately proportional to vehicle speed, representing minimum safe-following distance at the existing speed, and output circuit means responsively connected to the receiver means and to be controlled by said measuring device for producing a warning indication output in response to received signals occurring prior to termination of the established interval.

4. The vehicle warning system defined in claim 3, wherein the measuring device comprises a storage capacitance, a discharge circuit for said capacitance, a vehicle speed-controlled voltage source operable to produce a voltage approximately proportional to vehicle speed, means operated synchronously with transmitter operation to connect the voltage source to the capacitance for charging the latter to such voltage substantially at the inception of each transmission-reception period, whereupon the capacitance commences its discharge, and threshold voltage means connected to the discharge circuit and in the output circuit means, said threshold voltage means rendering the output circuit inoperative to produce a warning indication output upon decay of condenser voltage below a predetermined threshold voltage established by said threshold voltage means.

5. The vehicle warning system defined in claim 4, adapted for utilizing of an existing stop and turning indicator light system in a carrier vehicle, including two stop and turning lights, energizing circuit means having a brake-operated switch operable to energize both lights simultaneously, having a sequence switch operable to intermittently energize and deenergize the lights, and turning indicator switch means operable at will to connect the latter switch to one light or the other to signal a turn, but normally positioned to permit energization of both lights by said brake-operated switch, said warning system output circuit comprising switch means operable in response to the output of such latter circuit to connect said energizing circuit to both lights simultaneously independently of said turning indicator switch means.

6. The system defined in claim 5, and additional switch means operatively arranged to connect the energizing circuit to both lights simultaneously, said latter switch means being connected to the voltage source and adapted to be operated thereby in response to a reduction of vehicle speed below a predetermined value, thereby to intermittently energize the two lights independently of the turning indicator switch means.

7. The vehicle warning system defined in claim 3, wherein the measuring device comprises a storage capacitance, a discharge circuit for said capacitance, a voltage source, means operated synchronously with transmitter operation to connect the voltage source to the capacitance for charging the latter to an initial voltage substantially at the inception of each transmission-reception period, whereupon the capacitance commences its discharge, and threshold voltage means connected to the discharge circuit and in the output circuit means, said threshold voltage means rendering the output circuit inoperative to produce a warning indication output upon decay of condenser voltage below a predetermined threshold voltage established by said threshold voltage means, said measuring device including means controlled by carrier vehicle speed and operable to increase and decrease the voltage difference between said initial voltage and said threshold voltage in proportion to increases and decreases of vehicle speed.

8. The vehicle warning system defined in claim 7, adapted for utilization of an existing stop and turning indicator light system in a carrier vehicle, including two stop and turning lights, energizing circuit means having a brake-operated switch operable to energize both lights simultaneously, having a sequence switch operable to intermittently energize and deenergize the lights, turning indicator switch means operable at will to connect the latter switch to one light or the other to signal a turn, but normally positioned to permit energization of both lights by said brake-operated switch, said warning system output circuit comprising switch means operable in response to the output of such latter circuit to connect said energizing circuit to both lights simultaneously independently of said turnnig indicator switch means.

9. A close-following vehicle warning system comprising ultrasonic sound-electrical transducer means adapted for mounting in a rearwardly facing direction on a carrier vehicle for directionally selective transmission and reception of ultrasonic sound energy impulses, transmitter means connected to said transducer means operatively to apply thereto periodic energizing impulses of electrical energy at ultrasonic frequency, receiver means connected to said transducer means for electrically detecting ultrasonic sound impulses incident thereon by reflection from objects in the path of the transmitted sound energy during the periods between transmitted impulses, said receiver means including a high-pass filter operable to discriminate against such electrically detected impulses shifted by Doppler effect to a frequency below said transmitter ultrasonic frequency, and warning indicator means adapted for mounting in the carrier vehicle to produce a warning indication to a vehicle following at an unsafely close distance behind the carrier vehicle, said latter means including means to measure carrier vehicle speed, means to measure the elapsed time interval between each transmitted impulse and the ensuing echo pulse received by reflection from the following vehicle, and means responsive to both such measurements to operate the warning indicator means in response to a ratio of speed measurement to interval measurement exceeding a predetermined value representing minimum safe-following distance.

References Cited in the file of this patent
UNITED STATES PATENTS

| | | |
|---|---|---|
| 2,408,711 | Volz | Oct. 1, 1946 |
| 2,706,809 | Hollins | Apr. 19, 1955 |
| 2,896,089 | Wesch | July 21, 1959 |